Oct. 31, 1950 P. S. VOSBIKIAN ET AL 2,528,326
SHEARS
Filed Jan. 28, 1950
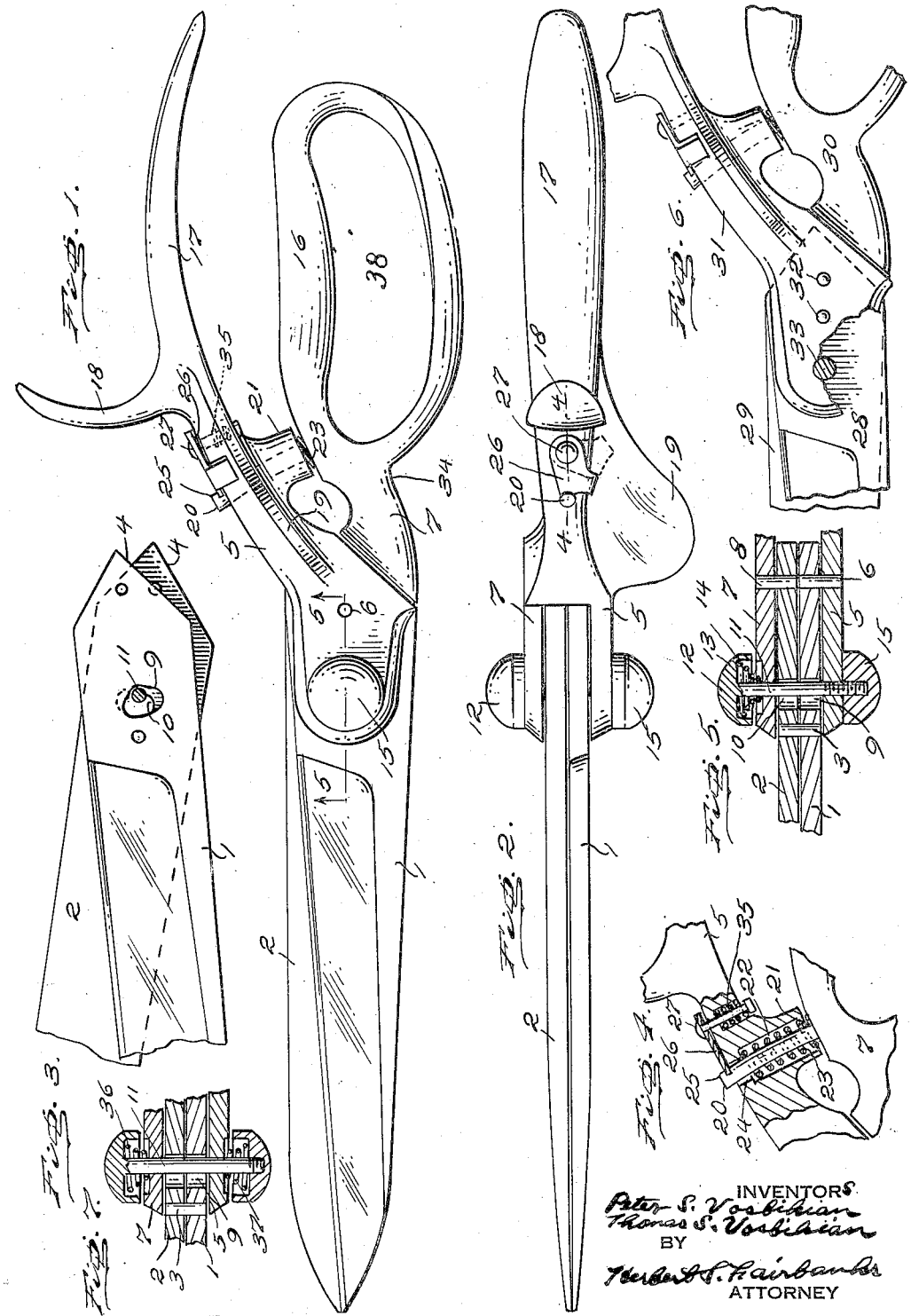
INVENTORS
Peter S. Vosbikian
Thomas S. Vosbikian
BY
Herbert F. Fairbanks
ATTORNEY Patented Oct. 31, 1950

2,528,326

UNITED STATES PATENT OFFICE 2,528,326

SHEARS

Peter S. Vosbikian and Thomas S. Vosbikian, Melrose, Pa.

Application January 28, 1950, Serial No. 141,089

1 Claim. (Cl. 30—260)

The object of this invention is to devise a novel construction and arrangement of the component parts of a bladed tool which can be operated with a minimum of power and which will provide a very powerful closing action of the blades.

A further object is to devise a novel construction of handle members having novel means to receive the fingers and thumb of the operator.

A further object of the invention is to devise novel means for maintaining the cutting or grasping edges of the blades in contact so that a cut the full length of the blades can be effected.

A further object is to devise novel locking mechanism to retain the handles and the blades in their closed condition.

With the foregoing and other objects in view as will hereinafter clearly appear, our invention comprehends a novel construction and arrangement of the component parts of a bladed tool.

It further comprehends novel handle members and their locking means; and novel means for maintaining the edges of the blades in contact at progressively advancing points of contact along the blades during their closing movements.

For the purpose of illustrating the invention, we have shown in the accompanying drawings preferred embodiments of it which we have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a side elevation of a bladed tool, embodying our invention.

Figure 2 is a top plan view.

Figure 3 is plan view of the blades, in detached condition.

Figure 4 is a section on line 4—4 of Figure 2.

Figure 5 is a section on line 5—5 of Figure 1.

Figure 6 is a side elevation, partly broken away of another embodiment of the invention wherein the blades have a fixed pivot and the compound leverage construction seen in the other figure is omitted.

Figure 7 is a section of another embodiment.

Similar numerals of reference indicate corresponding parts.

Referring to the drawings:

The bladed tool preferably has a compound leverage action on the blades as disclosed and claimed in our prior Patent No. 2,248,796 by the use of cam walls in the blades and a cam pin cooperating with such cam walls, as shown in Figures 3 and 5, but many of the features of the invention are present if only a single fixed pivot is provided for the blades. Thus the blades may have a pivotal connection with the handles, a fixed connection, or the blades and handles may be fabricated so that a blade and its handle is integral.

Referring first to the embodiment seen in Figures 1 to 5, inclusive, blades 1 and 2 are provided, the blades having a fixed pivot 3, see Figure 5, and their rear ends are of angular formation as at 4. The blade 1 is connected with a handle member 5 by a pivot 6, and in a similar manner the blade 2 is pivotally connected with a handle member 7 by a pivot 8.

The blade 1 has a cam slot 9 and the blade 2 has a cam slot 10 through which a cam pin 11 passes. This cam pin also passes through the forward extensions of the handle members, having a close fit in the handle 7 and being in threaded engagement with the extension of the handle 5. The cam pin has an enlarged head 12 recessed at 13 to receive a coiled conical spring 14 which bears against the handle 7, and the cam pin cooperates with a nut 15 bearing against the handle 5.

The lower handle 7 has a finger receiving loop 38 and the upper stretch of the loop is tapered upwardly and inwardly as at 16 to facilitate proper contact with the fingers. The bottom of the handle is below the bottom of the blades so that it can be moved along a cutting surface with the blades raised above such surface. The upper handle 5 has a curved bar 17 which curves upwardly and rearwardly and is provided with a raised curved stop 18 for the hand of the operator. The upper handle has a laterally extending plate 19 at one side to serve as a rest for the front portion of the thumb of the operator.

The locking mechanism for the blades and handles is best seen in Figure 4. The lower handle has an upwardly extending stud 20. The upper handle has a depending boss 21 recessed at 22 to receive a spring 23 which bears at one end against an upper shoulder formed by the recess and at its opposite end against the lower handle. The recess 22 merges into an opening 24 through the handle so that the stud can extend through the handle. The stud has a slot 25 into which a keeper 26 pivoted on the handle 5 can pass, the pivot being shown at 27. The keeper or latch is in the form of a flat plate having a portion bent downwardly to form a contact portion for operating it.

The handles have right angle cutouts to receive the rear ends of the blades so that the median line of the blades is the same as that of the handles.

In Figure 6, blades 28 and 29 are fixed to their handles 30 and 31 respectively by rivets 32, each blade being connected to its handle in the same manner. A fixed pivot 33 passes through the blades and handles. A blade and its handle may be made integral by a stamping or drop forging operation. Except for the compound leverage and the pivoting of the blades the construction in Figure 6 is the same as in Figures 1 to 5 inclusive.

The lower handle is recessed as at 34 so that the forefinger of the operator can contact such portion.

In Figure 7, the cam pin passes freely through the handles 7 and 9 and the nut 15 is preferably recessed and threaded to the cam pin exterior of the juxtaposed handle at the free end of the cam pin. A spring 36 in the recessed head of the cam pin bears against the handle 7 and a spring 37 in the recess of the nut bears against the handle 9.

The keeper or catch 26 is always maintained in proper locking position by a spring 35 having one end bearing against a wall of a recess in the upper handle and having its opposite end bearing against a lower head on the pin 27.

In the operation of the bladed tool, the user inserts three fingers through the loop 38 in the lower handle and his forefinger contacts the wall of the recess 34. The ball of the thumb contacts the top of the bar 17 and the forward end of the thumb rests on the plate 19. The handles are constructed and arranged to receive the hand in a natural manner and provides for exerting maximum power on the handles.

During the closing movement of the blades, the cam pin cooperates with the cam faces in the blades to exert a very powerful pressure on the blades.

Special attention is directed to the spring 14. A helical conical spring is employed, the smaller coils nesting into the larger coils when compressed to bring all of the coils into a small space and when fully compressed the coils are in the same plane. This feature together with the recesses for seating the spring and the fact that the spring encircles the cam pin provides a very efficient spring action on the blades and a very compact construction.

Having thus described our invention, what we claim as new and desire to secure by Letters Patent is:

Shears, comprising blades, a pivot pin forming a fixed pivot for the blades, said blades having cam slots, each cam slot extending laterally across the median line of its blade in proximity to said pivot pin, handles pivotally connected with the rear ends of the blades, a cam pin having at one end an enlarged head with a recess opening through its inner face, said cam pin passing through one handle, through the cam slots and threaded into the other handle, a spring in said recess and bearing against the outer face of a juxtaposed handle, said pivot pin, cam pin and handle pivots being disposed in alignment along the median line of the blades when the blades are closed.

PETER S. VOSBIKIAN.
THOMAS S. VOSBIKIAN.

REFERENCES CITED

The following references are of record in the file of this patent:

UNITED STATES PATENTS

| Number | Name | Date |
|---|---|---|
| 188,601 | Delkescamp | Mar. 20, 1877 |
| 291,623 | Plumb | Jan. 8, 1884 |
| 826,587 | Linscott | July 24, 1906 |
| 841,690 | Holtgrave | Jan. 22, 1907 |
| 879,064 | Prohaska | Feb. 11, 1908 |
| 906,632 | Jensen | Dec. 15, 1908 |
| 932,390 | Hobbs | Aug. 24, 1909 |
| 1,827,149 | Heimerdinger | Oct. 13, 1931 |
| 1,931,045 | Vosbikian et al. | Oct. 17, 1933 |
| 2,248,796 | Vosbikian et al. | July 8, 1941 |